(12) United States Patent
Clifton et al.

(10) Patent No.: US 6,779,273 B1
(45) Date of Patent: Aug. 24, 2004

(54) COAXIAL CABLE CUTTING TOOL

(75) Inventors: Mark B. Clifton, West Windsor, NJ (US); Ivan Pawlenko, Holland, PA (US); Larry Samson, Langhorne, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/400,220

(22) Filed: Mar. 27, 2003

(51) Int. Cl.$^7$ ................................................. H02G 1/12
(52) U.S. Cl. ......................................... 30/90.3; 30/90.2
(58) Field of Search ................................ 30/90.1, 90.2, 30/90.3, 278, 279.2, 299, 301, 306, 307; 81/9.4

(56) References Cited

U.S. PATENT DOCUMENTS

| | | | | | |
|---|---|---|---|---|---|
| 4,730,391 A | * | 3/1988 | Wood | ......................... | 30/90.1 |
| 4,731,928 A | * | 3/1988 | Jackson | ....................... | 30/90.2 |
| 4,945,636 A | * | 8/1990 | Takizawa | ..................... | 30/91.2 |
| 4,979,299 A | * | 12/1990 | Bieganski | .................... | 30/90.1 |
| 5,398,413 A | * | 3/1995 | Chen | .......................... | 30/90.1 |
| 5,487,220 A | * | 1/1996 | Saitou | ........................ | 30/90.6 |
| 6,079,104 A | | 6/2000 | Krampe | ...................... | 30/90.1 |
| 6,415,499 B1 | | 7/2002 | Holland et al. | ............. | 29/564.4 |
| 6,467,171 B2 | | 10/2002 | Tarpill | ........................ | 30/90.2 |
| 6,510,611 B2 | | 1/2003 | Edwards et al. | ............. | 30/90.6 |
| 2004/0020054 A1 | * | 2/2004 | Liaw | .......................... | 30/90.7 |

* cited by examiner

Primary Examiner—Hwei-Siu Payer

(57) ABSTRACT

A cutting tool that can be used to form a stepped cable end prior to the attachment of an electrical connector to a coaxial cable. The cutting tool has a blade assembly supported inside a housing on a pair of cams. A coaxial cable is inserted into the cutting tool and the housing is rotated about the cable to push the blade assembly along spiral tracks in the cams. According to one embodiment of the invention, the blade assembly has three blades, each blade sized and positioned to make a cut of the corresponding appropriate depth in the coaxial cable thereby forming the desired stepped cable end. Cutting tools of the invention may be adapted for preparation of large-diameter (e.g., over 1 inch) coaxial cables.

15 Claims, 3 Drawing Sheets

COAXIAL CABLE CUTTING TOOL

BACKGROUND OF THE INVENTION

1. Field of the Invention

The present invention relates to preparation of coaxial cables and, more specifically, to cutting tools for removing portions of a coaxial cable prior to the attachment of a connector.

2. Description of the Related Art

FIG. 1A schematically shows a representative unprepared coaxial cable 102 including two conductors, i.e., a wire core 104 and a shielding mesh 108. Cable 102 also has (i) an inner insulation layer 106 that electrically insulates core 104 from mesh 108 and (ii) an outer protective jacket 110 that encloses core 104, insulation layer 106, and mesh 108.

FIG. 1B schematically shows cable 102 (labeled 102') after it has been appropriately prepared for the attachment of an electrical connector. More specifically, cable 102' has a "stepped" cable end 112, which exposes core 104 and mesh 108 to meet the requirements for the selected type of connector. In particular, inner insulation layer 106, shielding mesh 108, and outer jacket 110 are removed from a first predetermined length of cable 102 to expose core 104, and outer jacket 110 is removed from a second predetermined length of cable 102 to expose shielding mesh 108. As a result, the connector can be properly attached to stepped cable end 112 of cable 102' as known in the art.

Preparing stepped cable end 112 may present significant problems for cable 102 having a relatively large diameter, e.g., over 1 inch. In particular, specialized tools developed for preparation of coaxial cables having a relatively small diameter are not sufficiently robust to perform similar operations on larger cables. As a result, technical personnel are often forced to use non-specialized tools such as hack saws and knives, which is inefficient in terms of time and often results in a poor-quality stepped cable end.

SUMMARY OF THE INVENTION

The problems in the prior art are addressed, in accordance with the principles of the invention, by a coaxial cable cutting tool that can be used to form a stepped cable end prior to the attachment of an electrical connector to a coaxial cable. In one embodiment, the cutting tool has a blade assembly supported inside a housing on a pair of cams. A coaxial cable is inserted into the cutting tool and the housing is rotated about the cable to push the blade assembly along spiral tracks in the cams. According to one embodiment of the invention, the blade assembly has three blades, each blade sized and positioned to make a cut of the corresponding appropriate depth in the coaxial cable thereby forming the desired stepped cable end. Cutting tools of the invention may be adapted for preparation of large-diameter (e.g., over 1 inch) coaxial cables.

According to one embodiment, the present invention is a tool designed to form a stepped cable end in a coaxial cable, comprising: a blade assembly supported in a housing by a first cam and a second cam, wherein: each cam is rotatably connected to the housing and has a spiral track; the blade assembly is adapted to move along the spiral tracks; and the motion of the blade assembly forms one or more cuts in the coaxial cable, said cuts corresponding to the stepped cable end.

According to another embodiment, the present invention is a method of forming a stepped cable end, comprising rotating a blade assembly about a coaxial cable, wherein: the blade assembly is supported in a housing by a first cam and a second cam; each cam is rotatably connected to the housing and has a spiral track; the blade assembly is adapted to move along the spiral tracks; and the motion of the blade assembly forms one or more cuts in the coaxial cable, said cuts corresponding to the stepped cable end.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 2A:
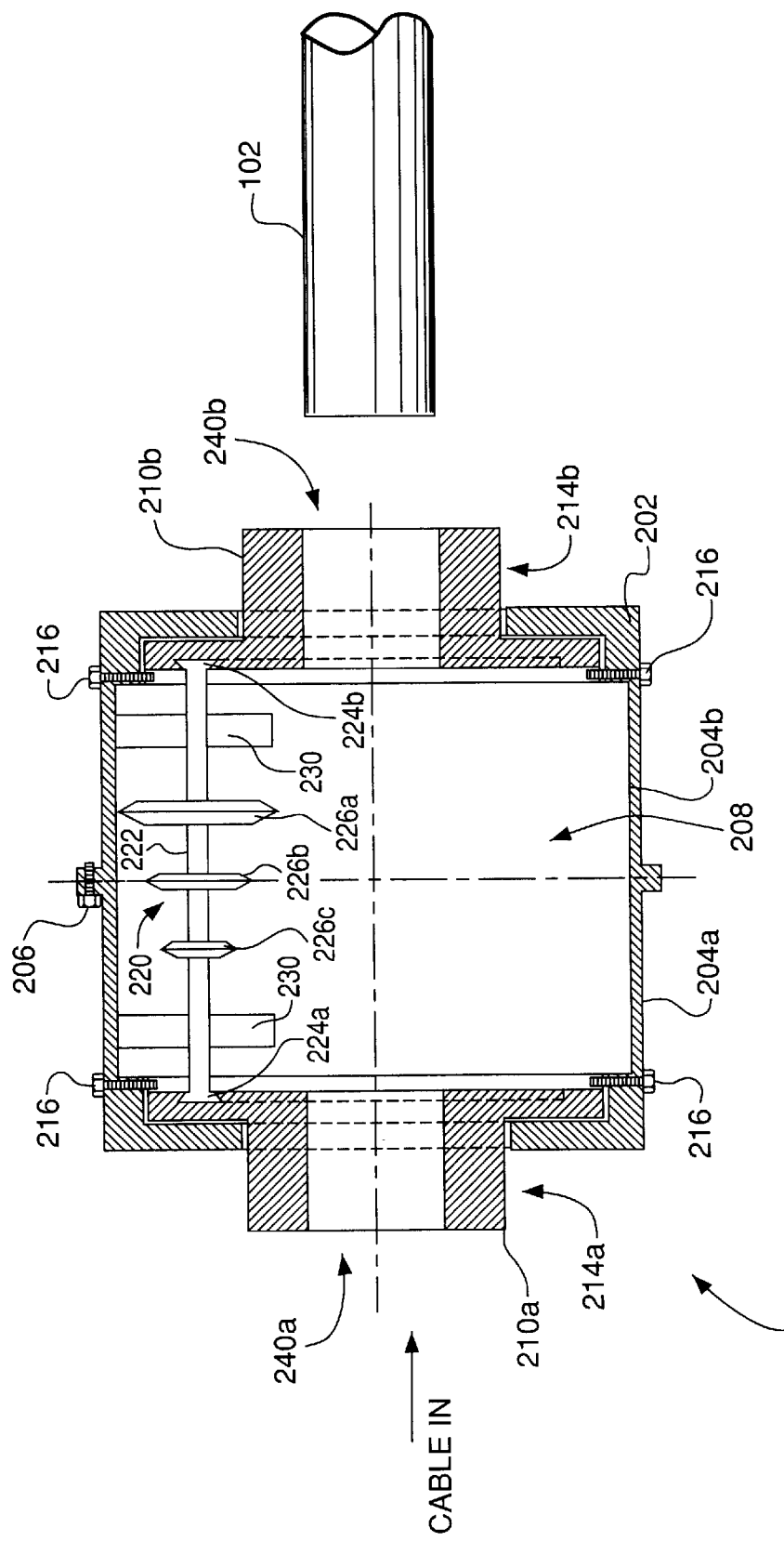
FIGS. 2A–C schematically illustrate a coaxial cable cutting tool according to one embodiment of the present invention.
Figure 2C:
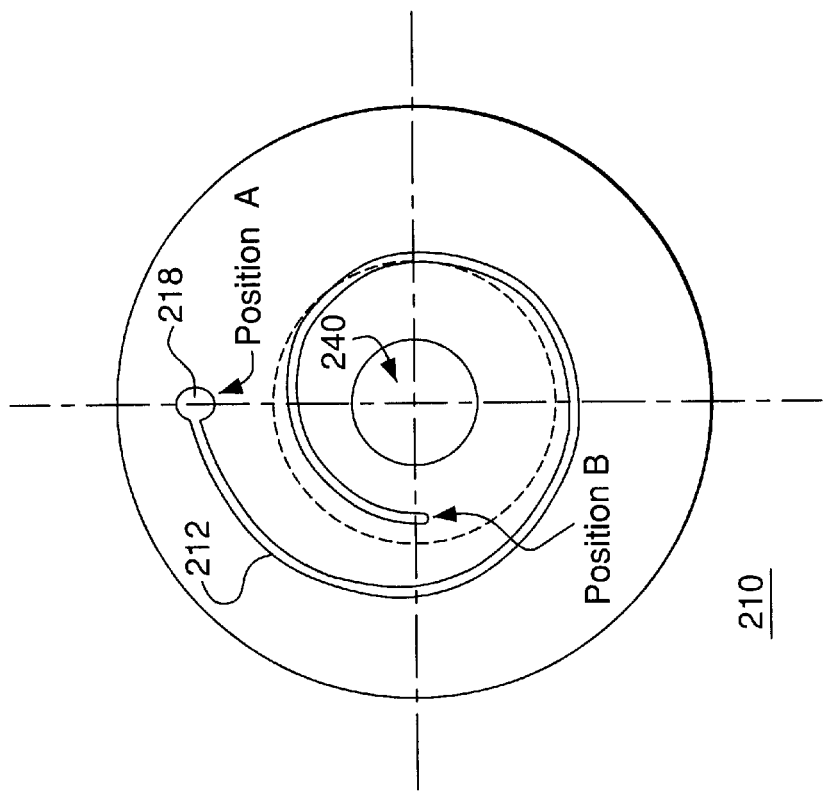
Figure 2B:
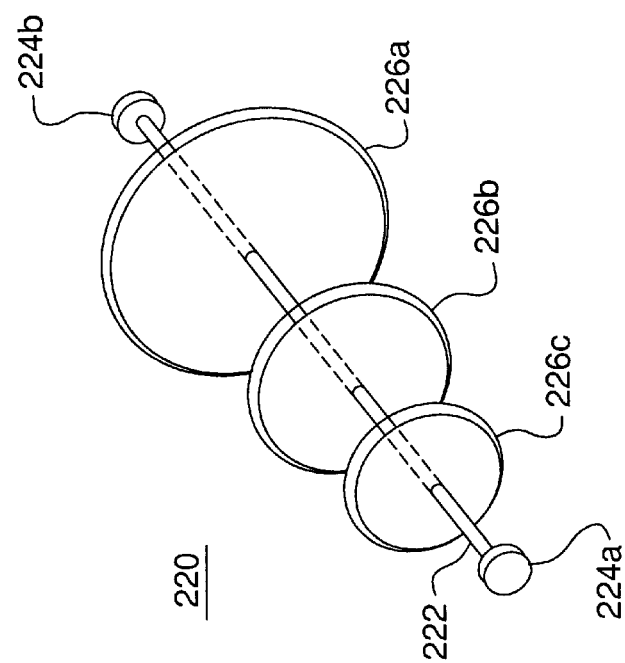

FIGS. 2A–C schematically illustrate a coaxial cable cutting tool 200 according to one embodiment of the present invention. More specifically, FIG. 2A is a cross-sectional view of tool 200; FIG. 2B shows a perspective view of a blade assembly used in tool 200; and FIG. 2C is a side view of a cam used in tool 200.

Tool 200 includes a cylindrical housing 202 preferably comprising two complementary cylindrical portions 204a–b fastened together, e.g., using screws, one of which, screw 206, is shown in FIG. 2A. The screws may be removed to unfasten portions 204a–b to gain access into a cavity 208 formed by these portions. A blade assembly 220 and two cams 210a–b further illustrated in FIGS. 2B–C, respectively, are inserted into cavity 208 as shown in FIG. 2A. More specifically, each cam 210 is inserted into the corresponding portion 204 of housing 202 and is held in place by respective screws 216 such that the cam can be rotated with respect to the housing, e.g., using portion 214 of the cam protruding through an opening in the housing. Each cam 210 has a spiral track 212 (FIG. 2C) formed such that spiral track 212a of cam 210a is a mirror image of spiral track 212b of cam 210b.

Figure 1B:
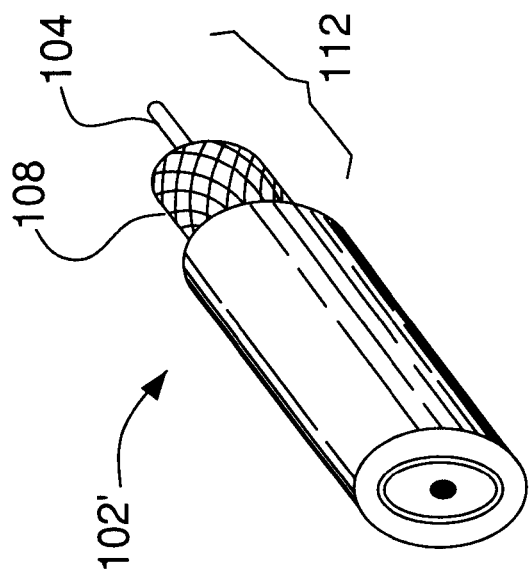
FIGS. 1A–B schematically show perspective views of a coaxial cable that is being prepared for the attachment of a connector.
Figure 1A:
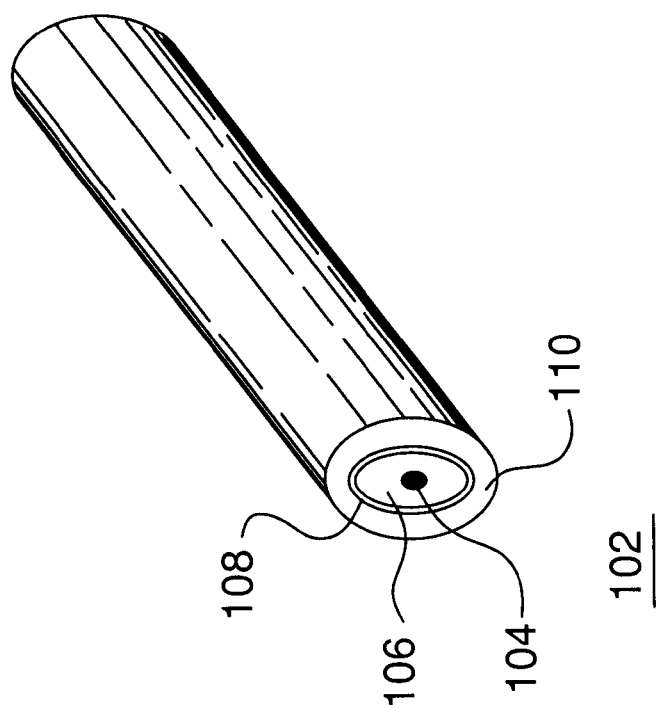

Blade assembly 220 (FIG. 2B) includes three circular blades 226a–c mounted on a shaft 222. Blade diameters and distances between the blades are chosen such that they correspond to the steps of stepped end 112 of cable 102' (FIG. 1B). For example, the distances between (i) blades 226a and 226b and (ii) blades 226b and 226c correspond to the first and second predetermined lengths, respectively, which lengths were described above in the context of FIG. 1B. The ends of shaft 222 have cam followers 224a–b, each of which is inserted through an opening 218 (FIG. 2C) into track 212 in the corresponding cam 210. As a result, blade assembly 220 is supported within cavity 208 of housing 202 and can travel along tracks 212 with shaft 222 being substantially parallel to the center axis of the housing. A pair of shaft pushers 230 attached to housing 202 move shaft 222 of blade assembly 220 along tracks 212 when housing 202 is rotated with respect to cams 210a–b.

The following describes a representative procedure of forming stepped cable end 112 in cable 102 using tool 200. Prior to the insertion of cable 102 into tool 200, shaft 222 of blade assembly 220 is placed in terminal position A of track 212 marked in FIG. 2C. As a result, blades 226a–c are positioned as shown in FIG. 2A, i.e., outside of the central portion of cavity 208 between cylindrical openings 240a–b in cams 210a–b. Cable 102 is then inserted into tool 200, for example, through opening 240b as shown in FIG. 2A such that the end of the cable is pushed all the way through cavity 208 and comes out on the opposite side of the tool through opening 240a. After the insertion, cable 102 is fixed with respect to cams 210a–b, for example, using optional friction clamps (not shown) or by the tool operator firmly holding together the cable and portion 214 of cam 210.

To begin the cut, housing 202 is rotated with respect to cams 210a–b and cable 102 such that shaft pushers 230 drive shaft 222 of blade assembly 220 along tracks 212 from terminal position A toward terminal position B (FIG. 2C). When shaft 222 reaches position B, blade assembly 220 has moved toward the center axis of tool 200 and blades 226a–c have made cuts through the corresponding layers of cable 102. More specifically, blade 226a has cut through jacket 110, mesh 108, insulation layer 106, and core 104; blade 226b has cut through jacket 110, mesh 108, and insulation layer 106 leaving core 104 intact; and blade 226c has cut through jacket 110 leaving mesh 108, insulation layer 106, and core 104 intact. While shaft 222 is in position B, cable 102 is uncoupled from cams 210a–b, e.g., by loosening the friction clamps, such that both housing 202 and the cams can now be rotated about cable 102. With shaft 222 of blade assembly 220 locked in position B by shaft pushers 230, entire tool 200 is rotated about cable 102 in the direction corresponding to the motion of the blade assembly from position A to position B for at least one full turn. During this turn, each of blades 226a–c completes a cut through the corresponding layers of cable 102 around the entire cable circumference, at which point stepped cable end 112 is formed within cable 102.

To release cable 102 from tool 200, shaft 222 of blade assembly 220 is returned from position B to position A. This is accomplished, for example, as follows. First, cable 102 is fixed with respect to cams 210a–b, for example, as described above. Then, housing 202 is rotated about cams 210a–b and cable 102 in the reverse direction, i.e., the direction opposite to the direction of the cut. After one full turn of housing 202, shaft pushers 230 come into contact with shaft 222 on its opposite side and, as the rotation continues, drive the shaft along tracks 212 from position B toward position A (FIG. 2C) thereby moving blade assembly 220 away from the center axis of tool 200 and retracting blades 226a–c from cable 102. When shaft 222 reaches position A, cable 102' having stepped cable end 112 is pulled out from opening 240b while the excess material is removed through opening 240a.

Tool 200 provides a relatively simple and efficient way to produce high-quality stepped cable ends in large-diameter coaxial cables for the consequent attachment of cable connectors and can be refitted relatively easily for different cable and/or connector types. For example, blade assembly 220 and/or cams 210 can be changed without difficulty by opening housing 202. A different blade assembly, e.g., having a different number of blades and/or differently sized and/or positioned blades, may be inserted. Similarly, a different pair of cams corresponding to a different cable diameter may be installed.

Various materials and methods of manufacture may be employed in producing cutting tools of the invention. For example, the housing and cams may be made of plastic and produced using injection molding. The blades may be made of carbon steel or other robust cutting material. Various tool pieces may be designed to snap together for ease of assembly. The exterior surfaces of the housing and cams may be knurled to enhance the operator's ability to grip and rotate the same.

While this invention has been described with reference to illustrative embodiments, this description is not intended to be construed in a limiting sense. Although cutting tools of the invention were described as designed for coaxial cables of relatively large diameters, they can also be adapted for coaxial cables of relatively small diameters. Various modifications of the described embodiments, as well as other embodiments of the invention, which are apparent to persons skilled in the art to which the invention pertains are deemed to lie within the principle and scope of the invention as expressed in the following claims.

What is claimed is:

1. A tool designed to form a stepped cable end in a coaxial cable, comprising:
   a blade assembly supported in a housing by a first cam and a second cam, wherein:
      each cam is rotatably connected to the housing and has a spiral track;
      the blade assembly is adapted to move along the spiral tracks; and
      the motion of the blade assembly forms one or more cuts in the coaxial cable, said cuts corresponding to the stepped cable end.

2. The tool of claim 1, wherein the blade assembly comprises a shaft and one or more blades attached to the shaft, wherein a first end of the shaft is inserted into the spiral track in the first cam and a second end of the shaft is inserted into the spiral track in the second cam.

3. The tool of claim 2, wherein the shaft is substantially parallel to a center axis of the housing.

4. The tool of claim 2, wherein the housing includes one or more pushers designed to move the shaft along the spiral tracks.

5. The tool of claim 1, wherein at least part of one cam protrudes outside of the housing.

6. The tool of claim 1, wherein each cam has an opening for insertion of the coaxial cable.

7. The tool of claim 1, wherein the housing is adapted to receive different blade assemblies to form stepped cable ends for different connectors.

8. The tool of claim 1, wherein the housing has two parts secured together to provide access to the interior of the housing.

9. The tool of claim 1, wherein the tool is adapted to receive the coaxial cable having a diameter greater than about 1 inch.

10. A method of forming a stepped cable end, comprising rotating a blade assembly about a coaxial cable, wherein:
   the blade assembly is supported in a housing by a first cam and a second cam;
   each cam is rotatably connected to the housing and has a spiral track;
   the blade assembly is adapted to move along the spiral tracks; and
   the motion of the blade assembly forms one or more cuts in the coaxial cable, said cuts corresponding to the stepped cable end.

11. The method of claim 10, wherein the blade assembly comprises a shaft and one or more blades attached to the shaft, wherein a first end of the shaft is inserted into the spiral track in the first cam and a second end of the shaft is inserted into the spiral track in the second cam.

12. The method of claim 11, wherein the shaft is substantially parallel to a center axis of the housing.

13. The method of claim 11, wherein the housing includes one or more pushers designed to move the shaft along the spiral tracks.

14. The method of claim 10, wherein the rotating of the blade assembly comprises:

fixing the cams with respect to the coaxial cable; and rotating the housing about the cams and the coaxial cable to move the blade assembly along the spiral tracks.

15. The method of claim 14, wherein the rotating of the blade assembly further comprises:

locking the blade assembly in a terminal position of the spiral tracks;

uncoupling the cams from the coaxial cable; and rotating the housing and the cams about the coaxial cable.

* * * * *